(12) United States Patent
  Eswaran

(10) Patent No.: US 12,565,205 B2
(45) Date of Patent: Mar. 3, 2026

(54) AUTOMATIC SPEED CONTROL FOR A VEHICLE

(71) Applicant: JAGUAR LAND ROVER LIMITED, Whitley (GB)

(72) Inventor: Sridhar Eswaran, Coventry (GB)

(73) Assignee: Jaguar Land Rover Limited, Whitley (GB)

( * ) Notice: Subject to any disclaimer, the term of this patent is extended or adjusted under 35 U.S.C. 154(b) by 120 days.

(21) Appl. No.: 17/923,818

(22) PCT Filed: May 5, 2021

(86) PCT No.: PCT/EP2021/061900

§ 371 (c)(1),
(2) Date: Nov. 7, 2022

(87) PCT Pub. No.: WO2021/224346

PCT Pub. Date: Nov. 11, 2021

(65) Prior Publication Data

US 2023/0174062 A1     Jun. 8, 2023

(30) Foreign Application Priority Data

May 5, 2020    (GB) ..................................... 2006619

(51) Int. Cl.
  *B60W 30/14*        (2006.01)
(52) U.S. Cl.
  CPC ....... *B60W 30/146* (2013.01); *B60W 2555/60* (2020.02); *B60W 2720/10* (2013.01)
(58) Field of Classification Search
  CPC ........... B60W 30/146; B60W 2555/60; B60W 2720/10
  See application file for complete search history.

(56) References Cited

U.S. PATENT DOCUMENTS 6,693,555 B1 *   2/2004   Colmenarez ..... G08G 1/096716
                                            340/602
8,311,734 B2 *  11/2012   Georgis ........... G08G 1/096775
                                            701/423

(Continued)

FOREIGN PATENT DOCUMENTS

DE       102014017522 A1    6/2015
DE       102016225774 A1 *  6/2018
              (Continued)

OTHER PUBLICATIONS

International Search Report corresponding to International Application No. PCT/EP2021/061900, dated Aug. 9, 2021, 5 pages.

(Continued)

*Primary Examiner* — Rachid Bendidi
*Assistant Examiner* — Nada Mahyoob Alqaderi
(74) *Attorney, Agent, or Firm* — Troutman Pepper Locke LLP; Dustin B. Weeks; Nicholas H. Doss

(57)           ABSTRACT

Aspects of the present invention relate to an automatic speed control system, a method (200) for automatically controlling the speed of a vehicle, and a vehicle comprising the system or for carrying out the method. The system and method obtains (202) an initial speed limit, wherein the initial speed limit is the speed limit at a location of the vehicle, receives (204) a signal identifying a speed limit offset; and sets (206) the speed of the vehicle to the initial speed limit combined with the offset. The system and method may obtain (208) an updated speed limit and set (210) the speed of the vehicle to the updated speed limit. The system and method may obtain (212) a further speed limit; and if at least one criterion is met (214), set (216) the speed of the vehicle to the further speed limit combined with the offset.

8 Claims, 8 Drawing Sheets

(56) References Cited

U.S. PATENT DOCUMENTS

| | | | | |
|---|---|---|---|---|
| 10,431,083 | B2 * | 10/2019 | Hamada | G08G 1/16 |
| 2010/0121526 | A1 * | 5/2010 | Pham | B60W 30/146 |
| | | | | 340/441 |
| 2014/0067226 | A1 * | 3/2014 | Lee | G01C 21/3697 |
| | | | | 701/96 |
| 2014/0277835 | A1 * | 9/2014 | Filev | G01C 21/3469 |
| | | | | 701/2 |
| 2015/0057831 | A1 * | 2/2015 | Finlow-Bates | G08G 1/096758 |
| | | | | 701/1 |
| 2015/0083035 | A1 * | 3/2015 | Paszkowicz | G01P 1/11 |
| | | | | 116/62.3 |
| 2016/0176401 | A1 * | 6/2016 | Pilkington | B60W 30/143 |
| | | | | 701/93 |
| 2017/0144660 | A1 | 5/2017 | Kagerer et al. | |
| 2017/0213454 | A1 * | 7/2017 | Mieth | G08G 1/09685 |
| 2017/0282942 | A1 * | 10/2017 | Mathews, Jr. | B61L 15/0062 |
| 2017/0334445 | A1 * | 11/2017 | Yahagi | B60W 10/08 |
| 2018/0023973 | A1 * | 1/2018 | Ivanov | G01C 15/002 |
| | | | | 701/119 |
| 2018/0037219 | A1 * | 2/2018 | Johri | B60W 30/18072 |
| 2019/0255989 | A1 * | 8/2019 | Rowell | G06V 20/597 |
| 2020/0302195 | A1 * | 9/2020 | Thelen | G08G 1/09623 |
| 2021/0253097 | A1 * | 8/2021 | Lacaze | B60W 40/105 |
| 2022/0063620 | A1 * | 3/2022 | Zwicky | B60W 30/10 |
| 2022/0119020 | A1 * | 4/2022 | Thiyagarajan | B61L 15/0072 |
| 2022/0135039 | A1 * | 5/2022 | Jardine | B60W 30/18163 |
| | | | | 701/26 |
| 2022/0212537 | A1 * | 7/2022 | McNew | B60W 50/085 |
| 2022/0219691 | A1 * | 7/2022 | Maleki | G06F 11/0754 |
| 2023/0373315 | A1 * | 11/2023 | Salter | B60W 20/00 |

FOREIGN PATENT DOCUMENTS

| | | | | | |
|---|---|---|---|---|---|
| EP | 3145778 | A1 | * | 3/2017 | B60K 31/0066 |
| EP | 3177500 | A2 | | 6/2017 | |
| KR | 20150103357 | A | * | 9/2015 | B60T 8/175 |
| SE | 1450599 | A1 | * | 11/2015 | B60K 31/0066 |
| WO | WO-2015178841 | A1 | * | 11/2015 | B60K 31/0066 |

OTHER PUBLICATIONS

Written Opinion of the International Searching Authority corresponding to International Application No. PCT/EP2021/061900, dated Aug. 9, 2021, 7 pages.

Combined Search and Examination Report under Sections 17 and 18(3) corresponding to Great Britain Application No. GB2006619. 7, dated Sep. 21, 2020, 7 pages.

* cited by examiner

100

102    Speed Limit Obtaining Means

106    Speed Adjusting Means

104    Input Means

108    Speed Limit Analysing Means

200

Obtain Initial Speed Limit ~202

Receive Offset ~204

Update Vehicle Speed to Speed Limit with Offset ~206

Obtain Updated Speed Limit ~208

Update Vehicle Speed to Updated Speed Limit ~210

Obtain Further Speed Limit ~212

Check Criterion ~214

Update Vehicle Speed to Further Speed Limit with Offset ~216

Figures 3A, 3B:
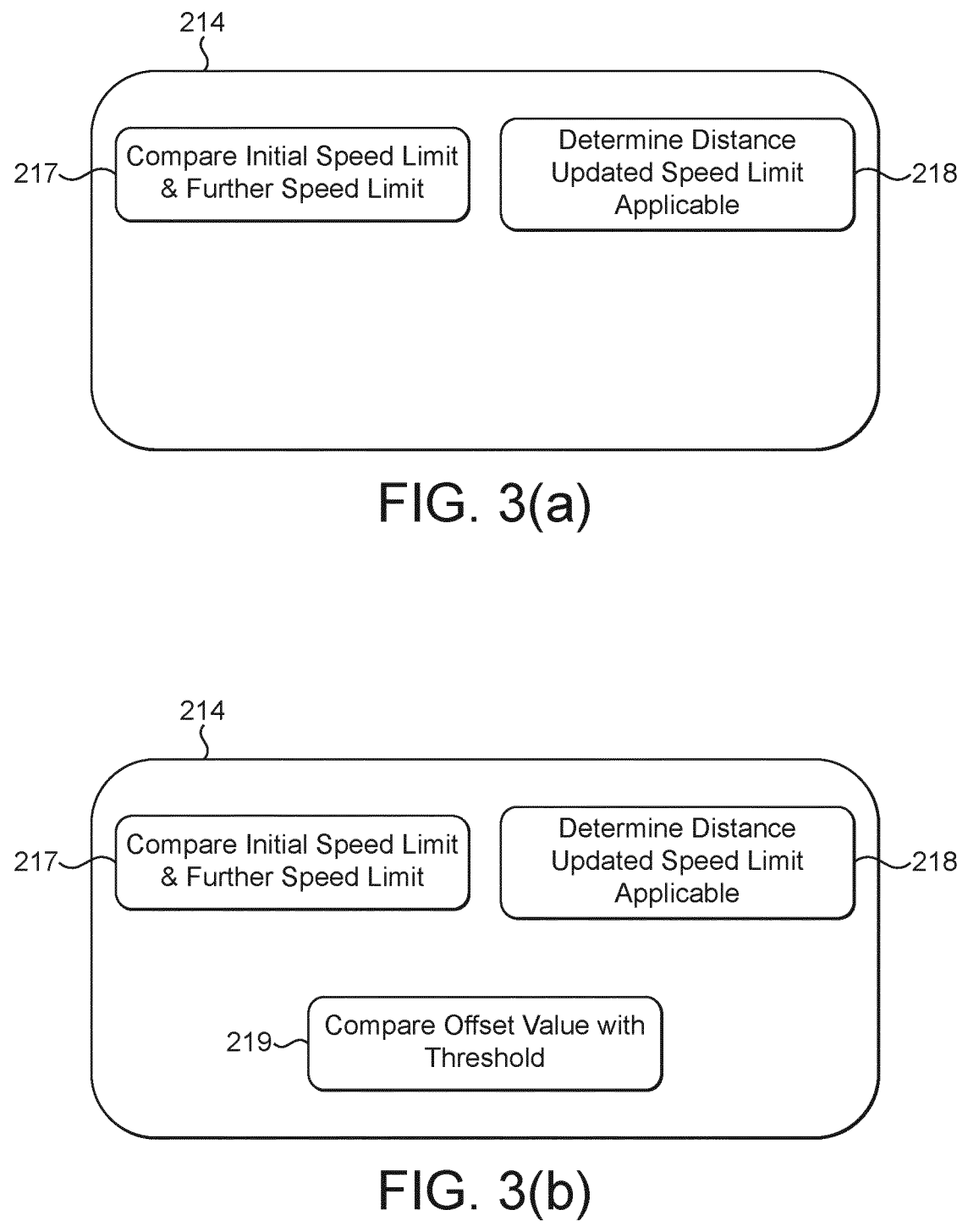

214

217 — Compare Initial Speed Limit & Further Speed Limit

Determine Distance Updated Speed Limit Applicable — 218

217 — Compare Initial Speed Limit & Further Speed Limit

Determine Distance Updated Speed Limit Applicable — 218

219 — Compare Offset Value with Threshold

AUTOMATIC SPEED CONTROL FOR A VEHICLE

TECHNICAL FIELD

The present disclosure relates to automatic speed control for a vehicle, particularly but not exclusively to an automatic speed control system and a method for automatically controlling the speed of a vehicle. Aspects of the invention relate to a system, to a method, to a non-transitory computer readable medium, and to a vehicle.

BACKGROUND

It is known to provide vehicles with systems to automatically control the speed of the vehicle. Such systems may be known as cruise control systems. More recently such systems include more advanced functionality and may be referred to as adaptive cruise control systems. Such adaptive cruise control systems may control the speed of vehicles based on sensor inputs providing information on the vehicles surroundings. For example, the adaptive cruise control system may react to sensors indicating that there is a slower-moving vehicle ahead of the vehicle by automatically reducing the vehicle's speed. Similarly, the adaptive cruise control system may control the vehicle speed to maintain a safe following distance to the vehicle ahead. Then, if the adaptive cruise control system detects that the slower moving vehicle is no longer present, it may automatically raise the vehicle speed back up to the originally set cruise control speed.

Adaptive cruise control systems may also use the speed limit for the vehicle's location to control the speed of the vehicle. This may be referred to as speed limit adaption. The adaptive cruise control system may obtain speed limit information for the location of the vehicle. Such speed limit information may be acquired, for example, through image capture and image analysis of speed limit signs, or through the use of GPS. The adaptive cruise control system may then set the vehicle speed to the speed limit.

Some adaptive cruise control systems may provide the option of setting the vehicle speed to the speed limit adjusted by a user-controlled offset to the speed limit. As such, the user may choose for the adaptive cruise control system to set the vehicle speed to be above or below the speed limit by a certain amount. The offset may apply, for example, until there is a change in the speed limit, or the user changes or removes it.

It is an aim of the present invention to address one or more of the disadvantages associated with the prior art.

SUMMARY OF THE INVENTION

Aspects and embodiments of the invention provide an automatic speed control system, a method for automatically controlling the speed of a vehicle, a non-transitory computer readable medium comprising computer readable instructions, and a vehicle as claimed in the appended claims.

According to an aspect of the present invention there is provided an automatic speed control system for a vehicle, the automatic speed control system comprising one or more controllers, the automatic speed control system configured to: set the speed of the vehicle to an initial speed limit combined with an offset; in response to an update to the speed limit, set the speed of the vehicle to the updated speed limit, and subsequently, in response to a further update to the speed limit and if at least one criterion is met, set the speed of the vehicle to the further speed limit combined with the offset. In this way, the user inconvenience of having to manually reapply the speed limit offset is avoided.

According to an aspect of the present invention there is provided an automatic speed control system for a vehicle, the automatic speed control system comprising one or more controllers, the automatic speed control system configured to: obtain an initial speed limit, wherein the initial speed limit is the speed limit at a location of the vehicle; receive a signal identifying a speed limit offset; and set the speed of the vehicle to the initial speed limit combined with the offset; obtain an updated speed limit; set the speed of the vehicle to the updated speed limit;

and subsequently, obtain a further speed limit; and if at least one criterion is met, set the speed of the vehicle to the further speed limit combined with the offset. This reduces user inconvenience in reapplying the speed limit offset.

Optionally there may be provided an automatic speed control system wherein the one or more controllers may comprise speed limit obtaining means to obtain the speed limit at the location of the vehicle; input means to receive the signal; speed limit adjusting means to adjust the speed of the vehicle to the speed limit combined with the offset, in response to the signal, and after a change in speed limit where the at least one criterion is met; and speed limit analysing means to analyse the speed limit for at least one change thereto and to analyse an updated speed limit in relation to the at least one criterion.

An automatic speed control system as described above wherein the system speed limit obtaining means and the input means comprises an electronic processor having at least one electrical input for receiving signals indicative of the speed limit and indicative of the speed limit offset, and an electronic memory device electrically coupled to the electronic processor and having instructions stored thereon; and wherein the speed limit analysing means and speed limit adjusting means to adjust the speed of the vehicle comprise the processor being configured access the memory device and execute the instructions stored therein such that it is operable to adjust the speed of the vehicle to the speed limit combined with the offset in response to the signal, and after a change in speed limit where the at least one criterion is met, and to analyse the speed limit for at least one change thereto and to analyse an updated speed limit in relation to the at least one criterion.

Optionally, the one or more controllers may comprise: speed limit obtaining means to obtain the speed limit at the location of the vehicle; input means to receive the signal; speed limit adjusting means to adjust the speed of the vehicle to the speed limit combined with the offset, in response to the signal, and after a change in speed limit where the at least one criterion is met; speed limit analysing means to analyse the speed limit for at least one change thereto and to analyse an updated speed limit in relation to the at least one criterion.

In an embodiment, the at least one criterion relates to a comparison of the initial speed limit and the further speed limit. The at least one criterion may be that the initial speed limit is equal to the further speed limit. In this way, the invention recognises that where speed limit has reverted to the original speed limit, the user would choose to have the same offset applied.

Optionally, the at least one criterion may relate to the distance for which the updated speed limit was applicable. The at least one criterion may specify that the distance for which the updated speed limit was applicable must be below a distance threshold. The distance threshold may be in the range 80 metres to 120 metres. In an embodiment, the distance threshold is 100 metres. The distance threshold may be adjustable by the user. In this way, the change in speed limit may be identified as being temporary, such that the user would choose to have the same offset applied when the temporary speed limit ends.

In an embodiment, the at least one criterion relates to the magnitude of the offset. The at least one criterion may include that the magnitude of the offset is less than a threshold value. The threshold value may be between 8 kilometres per hour to 12 kilometres per hour. In an embodiment, the threshold value is 10 kilometres per hour. The threshold value may be a percentage of the speed limit, for example, 5% of the speed limit or 10% of the speed limit. The threshold value may be user-configurable. In this way, an offset that is too large or too small would not be reapplied automatically.

Optionally, the automatic speed control system may comprise a camera and wherein the one or more controllers are configured to carry out image processing, such that the one or more controllers are configured to obtain a speed limit by identifying the speed limit from an image, captured by the camera, of speed limit signage for the location of the vehicle via image processing. This is an efficient manner of obtaining speed limit information.

In an embodiment, the automatic speed control system is configured to receive a signal to adjust the updated speed of the vehicle by a second offset. In this way, the user may have their chosen offset in effect.

According to another aspect of the invention, there is provided a method for automatically controlling the speed of a vehicle, comprising obtaining an initial speed limit, wherein the initial speed limit is the speed limit at a location of the vehicle; receiving a signal to adjust the speed of the vehicle by an offset; and setting the speed of the vehicle to the initial speed limit combined with the offset; obtaining an updated speed limit; setting the speed of the vehicle to the updated speed limit; and subsequently, obtaining a further speed limit; and if at least one criterion is met, setting the speed of the vehicle to the further speed limit combined with the offset. Such a method allows a user to avoid the inconvenience of manually reapplying the offset.

In an embodiment, the method comprises that the at least one criterion relates to a comparison of the initial speed limit and the further speed limit. The at least one criterion may be that the initial speed limit is equal to the further speed limit.

Optionally, the method may comprise that the at least one criterion relates to the distance travelled at the updated speed limit. The at least one criterion may specify that the distance for which the updated speed limit was applicable must be below a distance threshold. The distance threshold may be between 80 metres and 120 metres. In an embodiment, the distance threshold is 100 metres.

In an embodiment, the method comprises that the at least one criterion relates to the magnitude of the offset. The at least one criterion may include that the magnitude of the offset is less than a threshold value. The threshold value may be between 8 kilometres per hour and 12 kilometres per hour. In an embodiment, the threshold value may be 10 kilometres per hour.

Optionally, the method may comprise wherein obtaining a speed limit comprises capturing an image of speed limit signage for the location of the vehicle and identifying the speed limit therefrom via image processing.

According to yet another aspect of the invention, there is provided a non-transitory computer readable medium comprising computer readable instructions that, when executed by a processor, cause performance of the method for automatically controlling the speed of a vehicle.

According to a further aspect of the invention, there is provided a vehicle comprising an automatic speed control system.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 3(a) shows a block diagram illustrating one step of the embodiment of the invention shown in FIG. 2;

FIG. 3(b) shows a block diagram illustrating an alternative to the step shown in FIG. 3(a);

DETAILED DESCRIPTION

The present invention relates to an automatic speed control system, a method for automatically controlling the speed of a vehicle, and a vehicle. The automatic speed control system may form part of, or may be separate but complimentary to, an adaptive cruise control (ACC) system in a vehicle. An ACC system adapts the vehicle's speed to the vehicle's environment, for example the presence and speed of another vehicle ahead of the vehicle in question, or the speed limit in force at the vehicle's location.

An ACC system that is adapted to control a vehicle's speed based on the applicable speed limit may allow a user to set an offset to be applied to the speed limit when setting the vehicle's speed. The user may apply an offset above or below the speed limit. The user may apply an offset within a certain threshold of the speed limit. In this way, the ACC system will not allow the user to set a vehicle speed significantly higher or lower than the speed limit.

Figure 1:
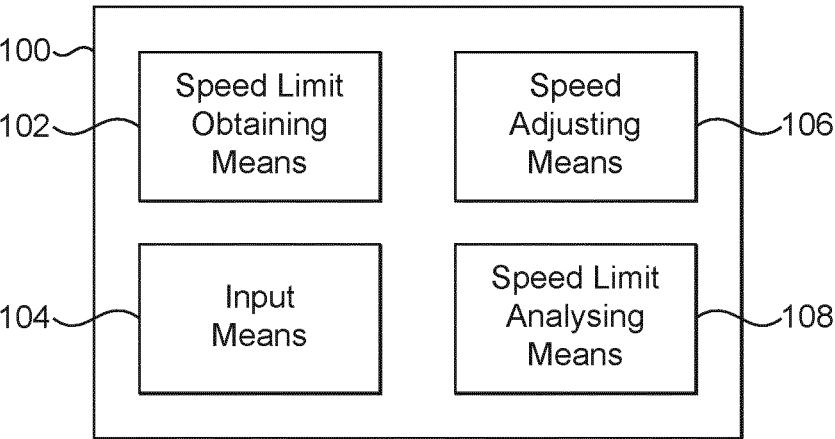
FIG. 1 shows a block diagram illustrating an embodiment of the invention.

With reference to FIG. 1, there is shown an automatic speed control system 100 for a vehicle. The automatic speed control system 100 comprises speed limit obtaining means 102, input means 104, speed adjusting means 106, and speed limit analysing means 108. The speed limit obtaining means 102 obtain the speed limit at the location of the vehicle. The input means 104 receive a signal identifying a speed limit offset. The speed adjusting means 106 adjust the speed of the vehicle to the speed limit combined with the offset, in response to the signal. The speed adjusting means 106 also adjust the speed of the vehicle to the speed limit combined with the offset after a change in speed limit where the at least one criterion is met. The speed limit analysing means 108 analyse the speed limit for a change thereto and analyse the changed speed limit in relation to at least one criterion.

The speed limit obtaining means 102, input means 104, speed limit analysing means 108, and speed adjusting means 106 may be implemented by one or more controllers. The one or more controllers may be implemented by a processor. The one or more controllers may be configured to obtain an initial speed limit, wherein the initial speed limit is the speed limit at a location of the vehicle. The one or more controllers may be configured to receive a signal identifying a speed limit offset. The one or more controllers may be configured to set the speed of the vehicle to the initial speed limit combined with the offset. The one or more controllers may be configured to obtain an updated speed limit. The one or more controllers may be configured to set the speed of the vehicle to the updated speed limit. The one or more controllers may be configured to obtain a further speed limit; and if at least one criterion is met, set the speed of the vehicle to the further speed limit combined with the offset.

Figure 2:
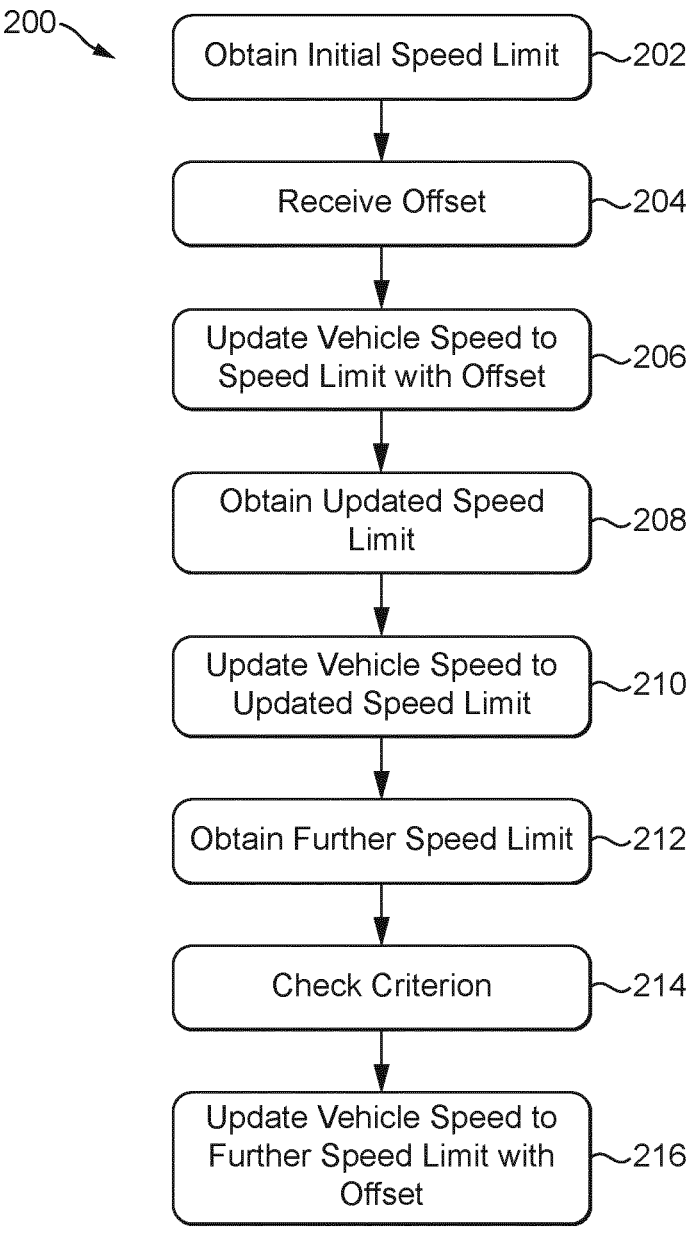
FIG. 2 shows a flow diagram illustrating an embodiment of the invention.

Referring to FIG. 2, there is shown a flowchart illustrating a method for automatically controlling the speed of a vehicle, indicated generally by the reference number 200, according to an embodiment of the invention. The method 200 begins at 202 by obtaining an initial speed limit, wherein the initial speed limit is the speed limit at a location of the vehicle. At 204, the method 200 comprises receiving a signal to adjust the speed of the vehicle by an offset. At 206, the method 200 comprises setting the speed of the vehicle to the initial speed limit combined with the offset. At 208, the method 200 comprises obtaining an updated speed limit. At 210, the method 200 comprises setting the speed of the vehicle to the updated speed limit. The updated speed limit may be referred to as a temporary speed limit or an interim speed limit. At 212, the method comprises obtaining a further speed limit. At 214, the method comprises checking for a criterion. In 216, the method 200 comprises setting the speed of the vehicle to the further speed limit combined with the offset, if the criterion has been met.

The automatic speed control system 100 may obtain the speed limit for the location of the vehicle in a number of ways. In a first example, systems on board the vehicle in question may capture an image of the speed limit signage for the location of the vehicle, and carry out image processing on the images to identify the speed limit illustrated in the signage. In another example, the speed limit for the location may be received from a remote transmitter, may be obtained from a navigation system, or may be looked-up based on a GPS-indication of the vehicle's location. The automatic speed control system 100 may obtain the speed limit for the location of the vehicle according to known methods used in adapted cruise control systems, and will not be discussed further herein.

The automatic speed control system 100 may receive the signal indicating the desired offset via a user interface of the vehicle. Such a user interface may include a voice interface, touchscreen, gesture recognition, a keypad or other arrangement of keys or buttons, and the like.

Once the desired offset has been obtained, the automatic speed control system 100 controls the speed of the vehicle to be that of the speed limit combined with the offset. For example, if the speed limit was 80 kmph, with an offset of +5 kmph, the automatic speed control system 100 would control the speed of the vehicle to be 85 kmph. In a further example, if the speed limit was 120 kmph, and the offset was −10 kmph, the automatic speed control system 100 would control the speed of the vehicle to be 110 kmph. The automatic speed control system 100 may control the speed of the vehicle according to any suitable method, including those known methods used in cruise control and adapted cruise control systems, and will not be discussed further herein.

When the automatic speed control system 100 detects a change in the speed limit, the speed of the vehicle is adjusted accordingly. If the user wishes to apply the offset again, he or she must enter the desired offset again via the user interface.

In some circumstances, the change in speed limit may be temporary and the speed limit returns to the previous speed limit after a reasonably short distance. Such temporary speed limits may be due, for example, to a junction, road-works, traffic calming measures or the like. It such cases the user must reapply the desired offset after this temporary speed limit change. This is inconvenient for the user. The present invention recognises certain circumstances wherein this user inconvenience can be avoided.

Referring now to FIG. 3(a), there is shown a block diagram of factors that may be considered when checking the criterion at 214 in the method 200 shown in FIG. 2. These circumstances may relate to the relationship between the initial speed limit at which the offset was applied, and the further speed limit after the interim speed limit. The circumstances may relate to the distance for which the interim speed limit was applicable. FIG. 3(a) shows in an embodiment, that the criterion checking block 214 of method 200 comprises, at 217, comparing the initial speed limit with the further speed limit; and at 218, determining the distance for which the interim speed limit was applicable. One criterion for re-implementing the previous offset, according to block 216 of the method 200, may be that the initial speed limit and the further speed limit are equal. Another criterion may be that the distance for which the updated speed limit was applicable is below a distance threshold. The distance threshold may be between 80 metres and 120 metres, and in an example, the distance threshold is 100 metres. The distance threshold may be configurable, at initialisation of the system, and/or by the user Referring now to FIG. 3(b), there is shown an alternative block diagram of factors that may be considered when checking the criterion at 214 in the method 200 shown in FIG. 2. These circumstances may further relate to the magnitude of the offset. FIG. 3(b) shows in an embodiment, that the criterion checking block 214 of the method 200 shown in FIG. 2 additionally comprises, at 219, comparing the magnitude of the offset with a threshold. The offset threshold value may be between 8 kilometres per hour and 12 kilometres per hour. In an example, the threshold value may be 10 kilometres per hour.

Figure 4:
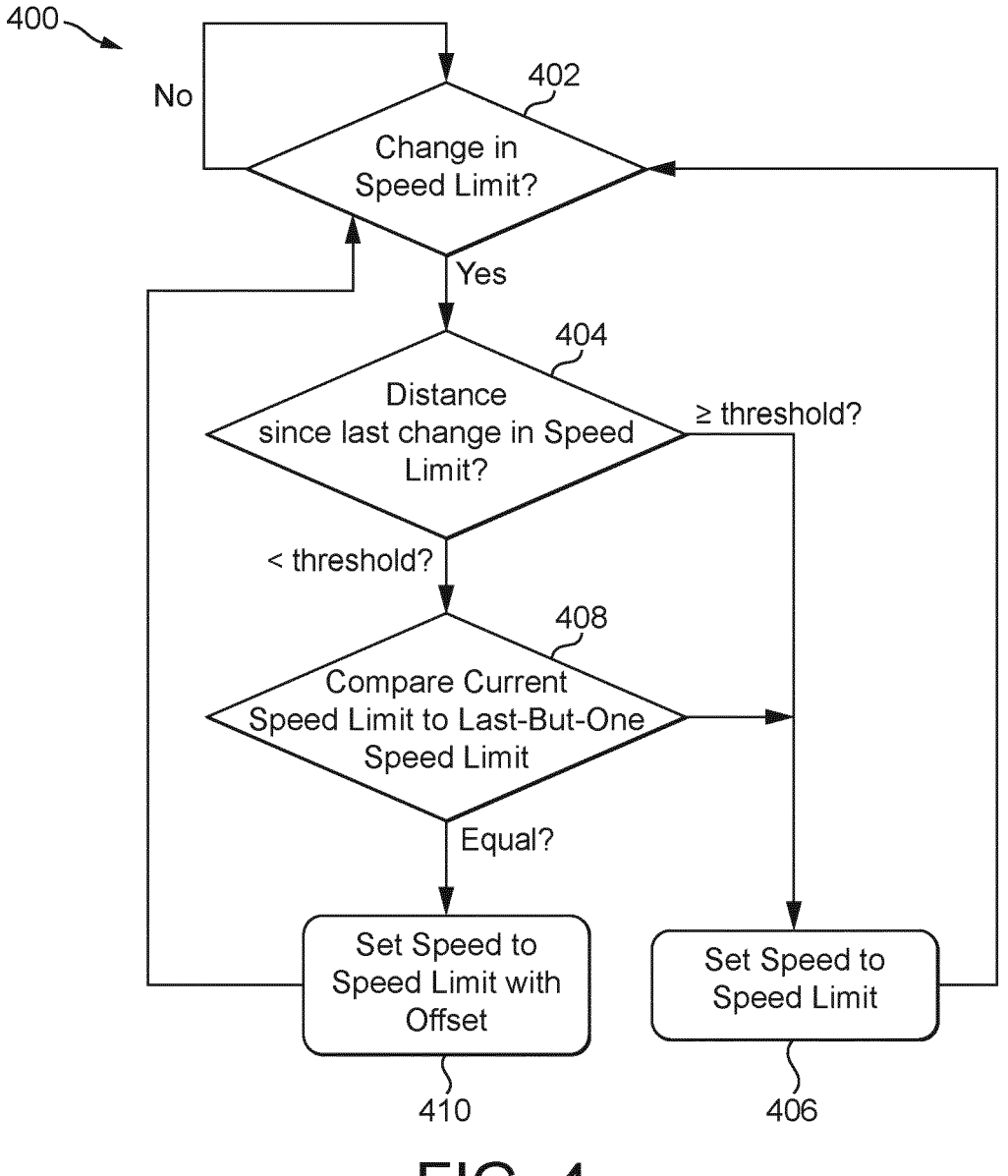
FIG. 4 shows a further flow diagram illustrating an embodiment of the invention.

Referring to FIG. 4, there is shown a flowchart illustrating a method, indicated generally by the reference numeral 400, according to an embodiment of the invention. The method 400 comprises, at 402, monitoring the speed limit for the location of the vehicle to detect a change in the speed limit. As discussed above, there are a number of known methods to derive the speed limit for the present location of that vehicle. If a change in speed limit is detected, the method 400 analyses, at 404, the distance since the last change in speed limit. If the distance since the last change in speed limit is greater than or equal to a distance threshold, the method 400 sets, at 406, the speed of the vehicle to the speed limit.

If the distance since the last change in speed limit is less than a distance threshold, the method 400 compares, at 408, the current speed limit to the last-but-one speed limit. That is, if the current speed limit is the nth speed limit encountered on this journey, then the nth speed limit is compared to the (n−2)th speed limit. If the current speed limit is not equal to the last-but-one speed limit, then the method 400 proceeds again to block 406 to set the speed of the vehicle to the speed limit. If however, the current speed limit is equal to the last-but-one speed limit, then method 400 sets, at 410, the speed of the vehicle to the speed limit adjusted by any offset that had been applied to the speed of the vehicle at the last-but-one speed limit.

Figure 5:
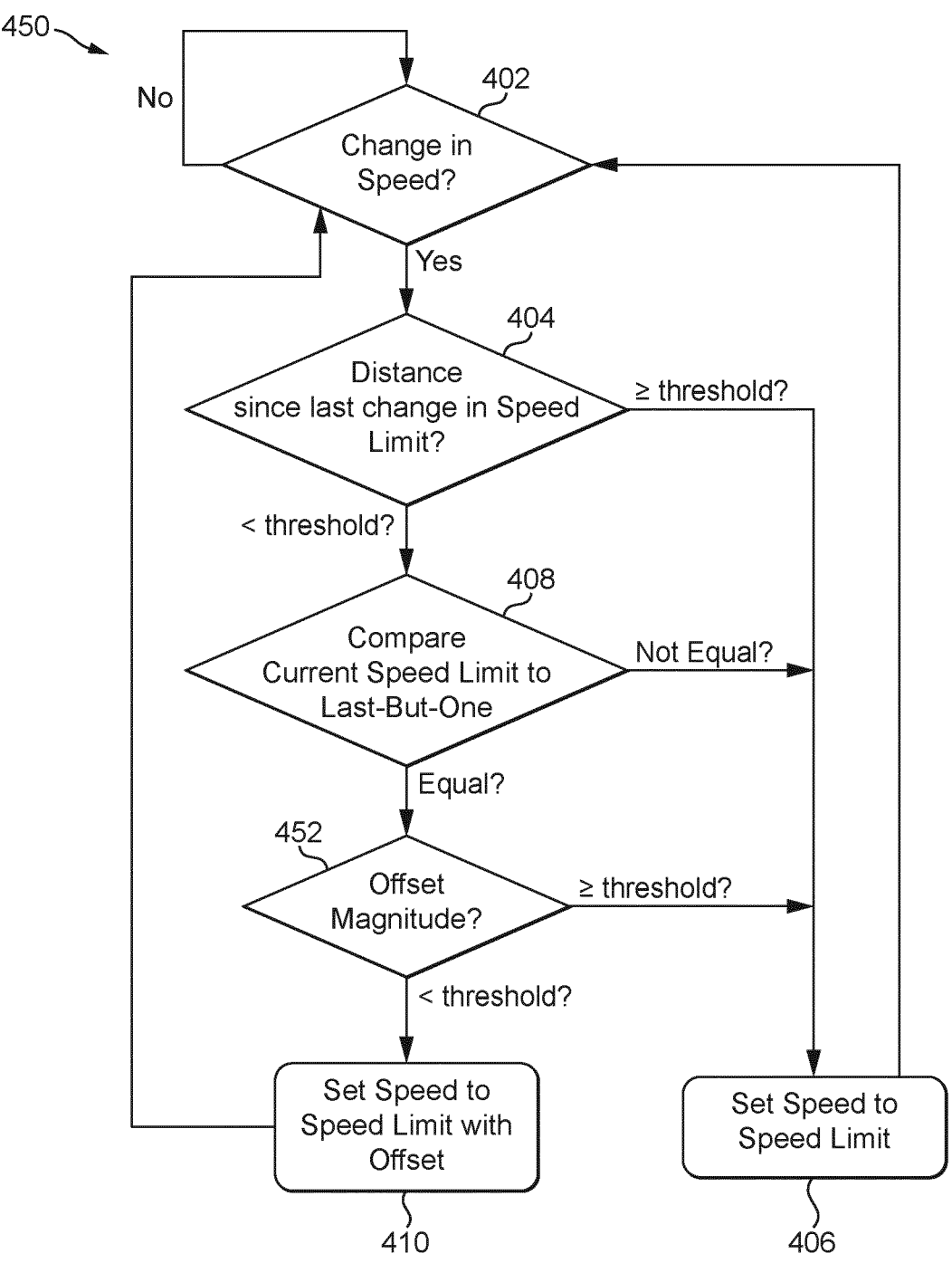
FIG. 5 shows another flow diagram illustrating an embodiment of the invention.

Referring to FIG. 5, there is shown a flowchart illustrating a method, indicated generally by the reference numeral 450, according to an embodiment of the invention. The method 450 of FIG. 5 is substantially similar to the method 400 shown in FIG. 4 except that the method 450 of FIG. 5 comprises an additional step. After the method 450 has compared the new speed limit to the last-but-one speed limit, the method checks, at 452, if the magnitude of any offset that had been applied to the last-but-one speed limit is below a threshold value. If the offset is less than the threshold value, then method 400 sets, at 410, the speed of the vehicle to the speed limit adjusted by that offset that had been applied to the speed of the vehicle at the last-but-one speed limit. If however, the offset is greater than or equal to the threshold value, the method 400 sets, at 406, the speed of the vehicle to the speed limit.

It will be understood that the methods 400, 450 described herein in relation to FIGS. 4 and 5 are not limited as to the order in which the different criteria are checked. For example, checking the distance travelled since the last change in speed limit may be checked after the speed limits are compared, and so on.

The methods for automatically controlling the speed of a vehicle described herein in relation to FIG. 2, 3, 4 or 5 may be carried out by the automatic speed control system 100.

In a further embodiment, the automatic speed control system 100 may receive a further signal during the interim speed limit, wherein the further signal is indicative of a second offset to be applied to the interim speed limit.

Figure 6:
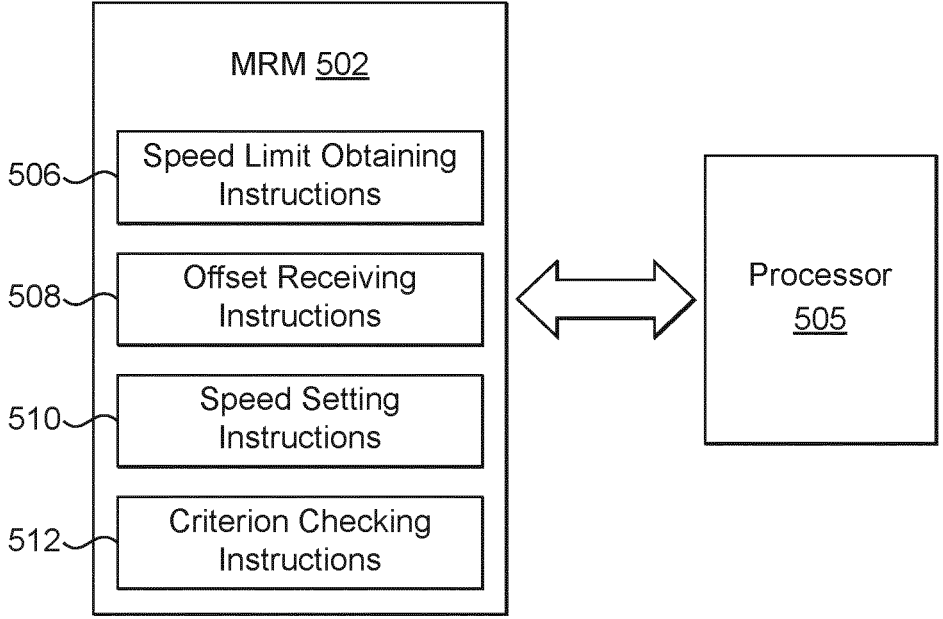
FIG. 6 shows a further block diagram illustrating an embodiment of the invention.

Referring to FIG. 6, there is shown a schematic of an example machine-readable medium 502 with a processor 505. The machine-readable medium 502 may comprise instructions which, when executed by a processor 505, cause the processor to perform the method 200 discussed above in relation to FIGS. 2 and 3. The machine-readable medium 502 may comprise instructions which, when executed by a processor 505, cause the processor to obtain the speed limit at the location of the vehicle. The machine-readable medium 502 may comprise speed limit obtaining instructions 506 to perform the obtaining. The machine-readable medium 502 may comprise instructions which, when executed by a processor 505, cause the processor to receive an input indicating the speed limit offset to be applied. The machine-readable instructions may comprise offset receiving instructions 508 to perform the receiving.

The machine-readable medium 502 may comprise instructions which, when executed by a processor 505, cause the processor to, set the speed of the vehicle. The machine-readable medium 502 may comprise speed setting instructions 510 to set the vehicle speed.

The machine-readable medium 502 may comprise instructions which, when executed by a processor 505, cause the processor to check for a criterion. The machine-readable medium 505 may comprise criterion checking instructions 512 to check for the criterion.

In some examples, the machine-readable medium 502 may comprise additional instructions which, when executed by a processor 505, cause the processor to perform alternative or additional actions in line with the methods and examples described herein.

The machine-readable instructions may, for example, be executed by a general purpose computer, a special purpose computer, an embedded processor or processors of other programmable data processing devices to realize the functions described in the description and diagrams. In particular, a processor or processing apparatus may execute the machine-readable instructions. Thus, functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Figure 7:
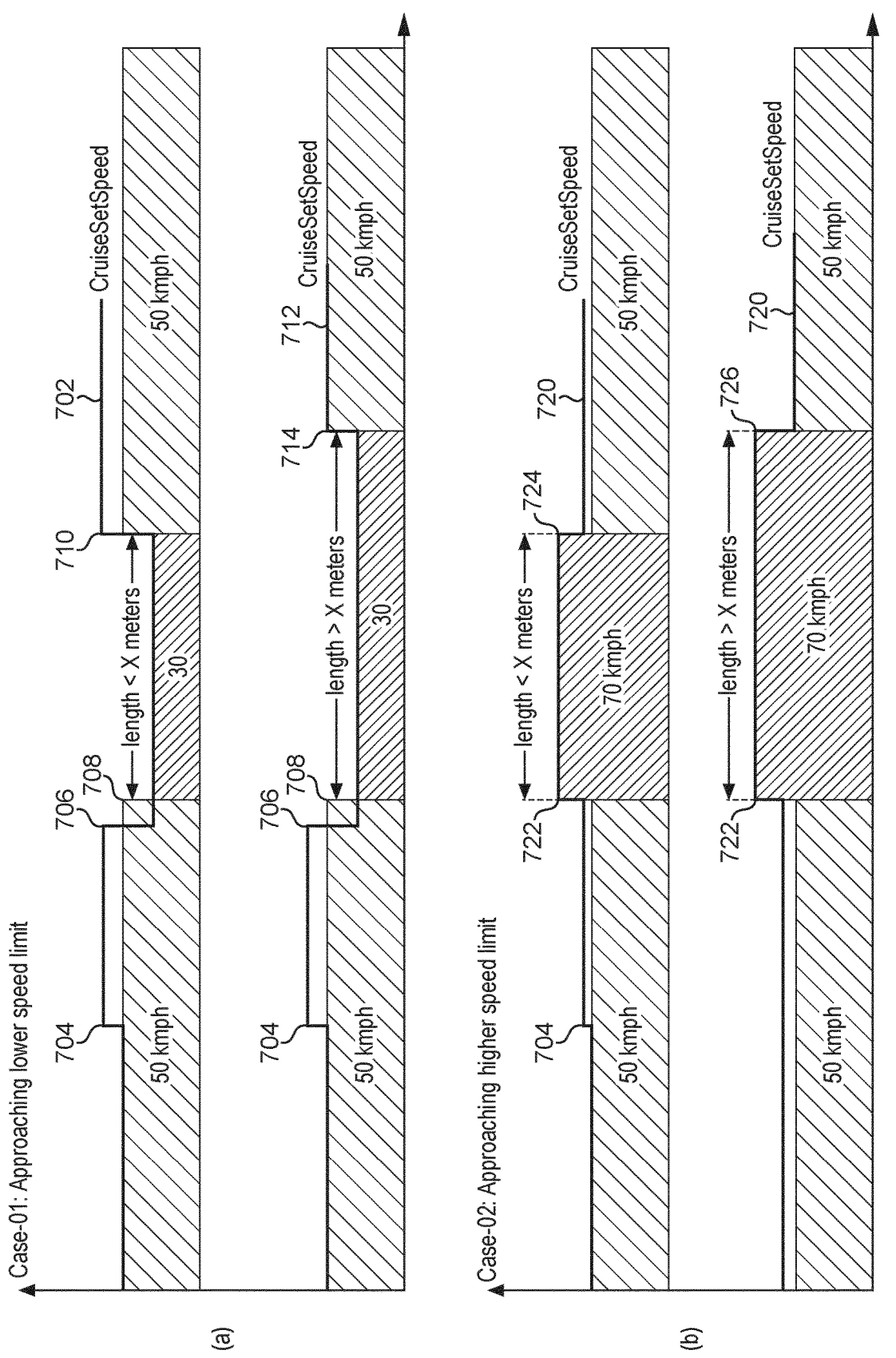
FIG. 7(a) shows a diagram illustrating a first example of an embodiment of the invention.
FIG. 7(b) shows a diagram illustrating a second example of an embodiment of the invention.

Referring to FIGS. 7(*a*) and 7(*b*), there is shown timing diagrams illustrating examples according to embodiments of the invention. In the FIG. 7(*a*), there is shown two examples where the updated speed limit is lower than the initial speed limit. In the upper diagram of FIG. 7(*a*), the speed set by the automatic speed control system 100 is indicated by the line 702. The speed limit is 50 kmph. At the start of the diagram, the vehicle speed is set to the speed limit. Then at 704, an offset is applied and the vehicle speed is increased to (50+offset) kmph. At 706, an upcoming reduced speed limit is detected, and the vehicle speed is reduced to the reduced speed limit of 30 kmph. At 708, the updated speed limit comes into effect and continues until 710. The vehicle speed is set to the updated speed limit between 708 and 710. The physical distance between 708 and 710 is less than a threshold distance. At 710, the speed limit returns to 50 kmph. Therefore, as the distance at which the updated speed limit was applicable is less than the threshold value and the further speed limit is equal to the initial speed limit, the previous offset is reapplied to the speed limit such that the vehicle speed is set to (50+offset) kmph. In the lower diagram of FIG. 7(*a*), the speed set by the automatic speed control system 100 is indicated by the line 712. The early stages 704, 706, 708 of the example are the same as those of the upper example. In the lower diagram of FIG. 7(*a*), the updated speed limit ends at 714, which is further away from 708 than 710 in the upper example. This leads to the distance at which the updated speed limit is applicable being greater than the threshold. Thus when the further speed limit is applicable at 714, the offset is not reapplied and the vehicle speed is set to 50 kmph.

In the FIG. 7(*b*), there is shown two examples where the updated speed limit is higher than the initial speed limit. In the upper diagram of FIG. 7(*b*), the speed set by the automatic speed control system 100 is indicated by the line 720. The speed limit is 50 kmph. At the start of the diagram, the vehicle speed is set to the speed limit. Then at 704, an offset is applied and the vehicle speed is increased to (50+offset) kmph. At 722, an increased speed limit is detected, and the vehicle speed is adjusted to the increased speed limit of 70 kmph. The updated speed limit continues until 724. The vehicle speed is set to the updated speed limit between 722 and 724. The physical distance between 722 and 724 is less than a threshold distance. At 724, the speed limit returns to 50 kmph. Therefore, as the distance at which the updated speed limit was applicable is less than the threshold value and the further speed limit is equal to the initial speed limit, the previous offset is reapplied to the speed limit such that the vehicle speed is set to (50+offset) kmph. In the lower diagram of FIG. 7(*b*), it can be seen that an offset is already applied. The updated speed limit ends at 726, which is further away from 722 than 724, and the distance at which the updated speed limit is applicable is greater than the threshold. Thus when the further speed limit is applicable at 726, the offset is not reapplied and the vehicle speed is set to 50 kmph.

Figure 8:
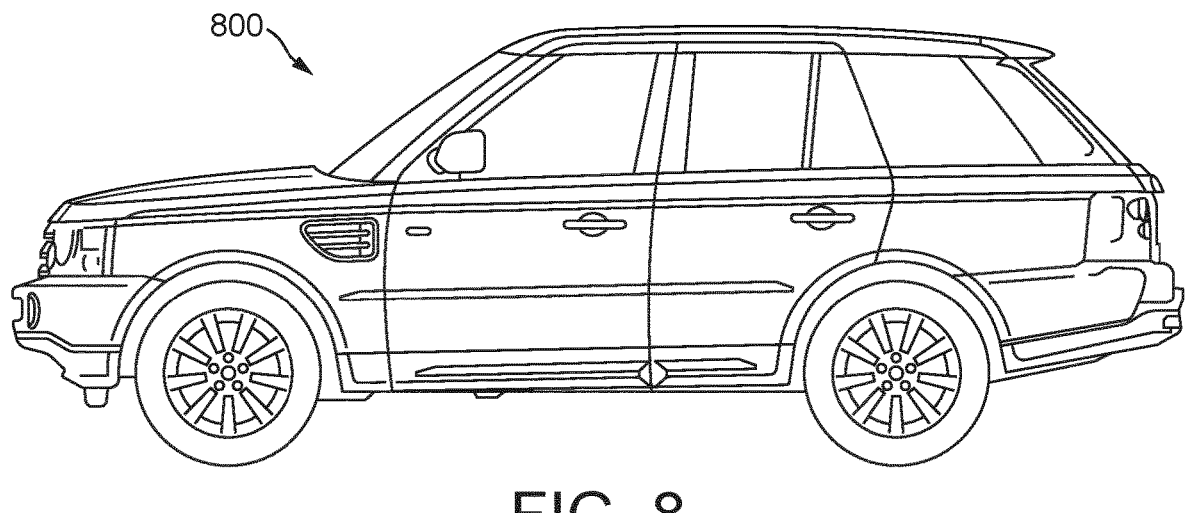
FIG. 8 shows a vehicle in accordance with an embodiment of the invention.

Referring to FIG. 8, there is shown a vehicle in accordance with an embodiment of the present invention, the vehicle being indicated generally by the reference numeral 800. The vehicle 800 may comprise the automatic speed control system described herein, and/or may be adapted to implement one or more of the methods for automatically controlling the speed of the vehicle.

Throughout the specification, the updated speed limit may be referred to as the temporary speed limit or interim speed limit. The initial speed limit may be referred to as the last-but-one or (n−2)th speed limit. The further speed limit may be referred to as the nth speed limit.

It will be appreciated that various changes and modifications can be made to the present invention without departing from the scope of the present application.

The invention claimed is:

1. An automatic speed control system for a vehicle, the automatic speed control system comprising one or more controllers, the automatic speed control system configured to:

obtain an initial speed limit for an initial road segment, wherein the initial speed limit is the speed limit at a location of the vehicle;

receive a signal identifying a speed limit offset applied by a user of the vehicle;

set the speed of the vehicle to the initial speed limit combined with the offset;

obtain an updated speed limit for an interim road segment disposed after the initial road segment and before a further road segment;

set the speed of the vehicle to the updated speed limit; and subsequently following setting of the speed of the vehicle to the updated speed limit, obtain a further speed limit for the further road segment, the further speed limit being equal to the initial speed limit;

determine a further vehicle set speed for the further road segment, wherein the further vehicle set speed is determined to be either a first vehicle set speed when a distance since setting the updated speed limit is less than a predetermined threshold or a second vehicle set speed when the distance since setting the updated speed limit is greater than or equal to the predetermined threshold, wherein the first vehicle set speed is determined as the further speed limit combined with the offset, and wherein the first vehicle set speed is different than the second vehicle set speed;

set the speed of the vehicle for the further road segment to the further vehicle set speed; and control the speed of the vehicle to be that of the further vehicle set speed.

2. The automatic speed control system as claimed in claim 1, wherein the one or more controllers comprise:

speed limit obtaining means to obtain the speed limit at the location of the vehicle;

input means to receive the signal;

speed adjusting means to adjust the speed of the vehicle to the speed limit combined with the offset, in response to the signal, and after a change in speed limit; and speed limit analysing means to analyse the speed limit for at least one change thereto and to analyse an updated speed limit.

3. The automatic speed control system as claimed in claim 1, configured to receive a signal to adjust the updated speed of the vehicle by a second offset.

4. A method for automatically controlling the speed of a vehicle, comprising:

obtaining an initial speed limit for an initial road segment, wherein the initial speed limit is the speed limit at a location of the vehicle;

receiving a signal to adjust the speed of the vehicle by an offset applied by a user of the vehicle;

setting the speed of the vehicle to the initial speed limit combined with the offset;

obtaining an updated speed limit for an interim road segment disposed after the initial road segment and before a further road segment;

setting the speed of the vehicle to the updated speed limit; and subsequently following setting of the speed of the vehicle to the updated speed limit, obtain a further speed limit for the further road segment, the further speed limit being equal to the initial speed limit;

determine a further vehicle set speed for the further road segment, wherein the further vehicle set speed is determined to be either a first vehicle set speed when a distance since setting the updated speed limit is less than a predetermined threshold or a second vehicle set speed when the distance since setting the updated speed limit is greater than or equal to the predetermined threshold, wherein the first vehicle set speed is determined as the further speed limit combined with the offset, and wherein the first vehicle set speed is different than the second vehicle set speed;

setting the speed of the vehicle for the further road segment to the further vehicle set speed; and controlling the speed of the vehicle to be that of the further vehicle set speed.

5. A non-transitory computer readable medium comprising computer readable instructions that, when executed by a processor, cause performance of the method of claim 4.

6. A vehicle comprising an automatic speed control system according to claim 1.

7. An automatic speed control system for a vehicle, the automatic speed control system comprising one or more controllers, the automatic speed control system configured to:

obtain an initial speed limit for an initial road segment, wherein the initial speed limit is the speed limit at a location of the vehicle;

receive a signal identifying a speed limit offset applied by a user of the vehicle;

set the speed of the vehicle to the initial speed limit combined with the speed limit offset for vehicle travel during the initial road segment;

after setting the speed of the vehicle to the initial speed limit, obtain an updated speed limit for an interim road segment disposed after the initial road segment and before a further road segment, wherein the updated speed limit is a different value than the initial speed limit;

set the speed of the vehicle to the updated speed limit; and following setting of the speed of the vehicle to the updated speed limit:

obtain a further speed limit for the further road segment, the further speed limit being equal to the initial speed limit;

determine whether at least one criterion is met, wherein the at least one criterion includes a criterion based on: the initial speed limit, the further speed limit, a magnitude of the speed limit offset, and a distance of the interim road segment;

when it is determined that the at least one criterion is met, set the speed of the vehicle for the further road segment to a first further vehicle set speed determined as the further speed limit combined with the speed limit offset; and in response to setting the speed of the vehicle to the first further vehicle set speed, control the speed of the vehicle to be that of the first further vehicle set speed.

8. The automatic speed control system as claimed in claim 1, wherein the second vehicle set speed is the further speed limit, and wherein the automatic speed control system is configured to:

determine the further vehicle set speed as the first vehicle set speed so that the speed of the vehicle is set to the further speed limit combined with the offset.

\* \* \* \* \*